US012265831B2

(12) United States Patent
Huang et al.

(10) Patent No.: US 12,265,831 B2
(45) Date of Patent: Apr. 1, 2025

(54) MICROCONTROLLER BANK-SWAPPING TRANSITION

(71) Applicant: AES Global Holdings PTE Ltd., Singapore (SG)

(72) Inventors: Chin-Feng Huang, Taipei (TW); Ping-Yang Lai, Taichung (TW); Sin-You Lin, Taichung (TW); Li-Chung Lin, Luodong Township (TW); Chih-Ling Chiou, Taipei (TW)

(73) Assignee: AES Global Holdings PTE Ltd., Singapore (SG)

( * ) Notice: Subject to any disclaimer, the term of this patent is extended or adjusted under 35 U.S.C. 154(b) by 613 days.

(21) Appl. No.: 17/547,938

(22) Filed: Dec. 10, 2021

(65) Prior Publication Data

US 2023/0185581 A1    Jun. 15, 2023

(51) Int. Cl.
*G06F 9/46* (2006.01)
*G06F 9/445* (2018.01)

(52) U.S. Cl.
CPC ................................. *G06F 9/445* (2013.01)

(58) Field of Classification Search
CPC ... G06F 9/445; G06F 9/46; G06F 9/44; G06F 9/44521; G06F 9/44536
USPC .......................................... 718/102; 717/101
See application file for complete search history.

(56) References Cited

U.S. PATENT DOCUMENTS

| 6,070,012 A * | 5/2000 | Eitner .................... G06F 8/656 |
| | | 719/331 |
| 11,011,969 B2 * | 5/2021 | Sawada ............. H02M 3/33515 |
| 2009/0007089 A1 | 1/2009 | Rothman et al. |
| 2015/0324137 A1 * | 11/2015 | Wu ......................... G06F 12/08 |
| | | 713/2 |
| 2020/0257521 A1 * | 8/2020 | Jayakumar ............ G06F 21/572 |
| 2021/0026620 A1 | 1/2021 | Rosner et al. |

FOREIGN PATENT DOCUMENTS

JP          2019159415 A        9/2019

OTHER PUBLICATIONS

International Search Report and Written Opinion for PCT Application No. PCT/SG2022/050898, mailed May 15, 2023; 13 pages.

* cited by examiner

*Primary Examiner* — Diem K Cao (57) ABSTRACT

A method is provided of swapping code execution among multiple microcontroller code banks. The microcontroller has computer-readable memory, a central processing unit, and an interrupt controller. The method comprises executing an instruction to process a first pointer storing an address location of a first application within a first code bank of computer-readable memory. The first application is executed based on processing the first pointer. The method also comprises replacing the address location of the first application stored within the first pointer with an address location of a second application stored with a second code bank of the computer-readable memory. The instruction to process the first pointer is executed to process the address location of the second application to execute the second application without stopping operation of the interrupt controller.

20 Claims, 10 Drawing Sheets

MICROCONTROLLER BANK-SWAPPING TRANSITION

TECHNICAL FIELD

Aspects of the disclosure relate to microcontroller operations and more particularly to switching operations from one memory bank to another.

BACKGROUND

Firmware functionalities are increasingly complex in microcontroller-based systems as requirements for systems that are faster, lighter, more powerful or the like are requested. In existing systems, new and/or improved requirements for increased performance where the existing hardware can tolerate such changes may necessitate an update to a previously-installed firmware image. For example, firmware updates may be needed to meet new performance requirements after a product has been manufactured and/or sold to a customer.

After a firmware re-flash, a system may be required to shut down and reboot to execute the updated firmware version. In some multi-bank microcontrollers, live firmware updates are possible that update the firmware image in a non-executing bank while the executing bank continues to operate. For example, the active firmware may be running from the memory in Bank_1 while a new version of the firmware is installed in the memory of Bank_2. The continuing operation of the firmware in Bank_1 allows the product to continue to operate during the re-flashing time of the memory in Bank_2, which can reduce overhead downtime involved in updating the firmware for the device. However, even with such reduction of overhead downtime, relying on the microcontroller's instruction set to swap execution of the firmware in Bank_1 to the firmware in Bank_2 still a reboot to run the new firmware. During the reboot, CPU processes and interrupt service routines (ISRs) of the microcontroller are stopped, which can increase the total cost of ownership of the system.

OVERVIEW

In accordance with one aspect of the present disclosure, a method of swapping code execution among multiple code banks of a microcontroller having computer-readable memory, a central processing unit, and an interrupt controller. The method comprises executing one or more operating software instructions from a first memory storage location of the computer-readable memory, the one or more operating software instructions comprising an instruction to process a first pointer having stored therein an address location of a first application stored within a first code bank of the computer-readable memory. The method also comprises executing the first application based on processing the address location of the first application stored within the first pointer and executing interrupt instructions based on an interrupt event identified by the interrupt controller. Executing the interrupt instructions comprises interrupting the execution of the first application during execution of the interrupt instructions and returning to the execution of the first application in response to terminating the execution of the interrupt instructions. The method also comprises replacing the address location of the first application stored within the first pointer with an address location of a second application stored with a second code bank of the computer-readable memory and executing the second application based on executing the one or more operating software instructions to process the address location of the second application stored within the first pointer without stopping operation of the interrupt controller.

In accordance with another aspect of the present disclosure, a system comprises a microcontroller including a central processing unit (CPU), an interrupt controller, and a flash memory having a first bank of memory and a second bank of memory. The microcontroller is configured to execute operating software instructions stored in the flash memory to execute instructions of a first application stored in the first bank of memory and identified by a first pointer, interrupt execution of the instructions of the first application to execute interrupt instructions via the interrupt controller based on an interrupt event, and continue execution of the instructions of the first application after the execution of the interrupt instructions. The microcontroller is further configured to execute the operating software instructions to execute instructions of a second application stored in the second bank of memory and identified by the first pointer. A memory location of the first application stored in the first pointer is replaced with a memory location of the second application prior to the execution of the operating software instructions to execute the instructions of the second application.

BRIEF DESCRIPTION OF THE DRAWINGS

The drawings illustrate embodiments presently contemplated for carrying out the invention.

In the drawings.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Embodiments of this disclosure improve the operation of a microcontroller-based system when switching or swapping control operations such as firmware operations from one bank to another. In the description of the embodiments below, examples of different or alternative firmware versions or images are described as being stored in separate flash memory banks, and the operative control switching from one bank to another is described. This disclosure overcomes the drawbacks of the prior art by switching control from a first bank to a second bank without the need to shut down either the CPU or the interrupt controller of the microprocessor. In one example, a new version of the firmware responsible for operation of the system is desired to be installed in the target bank (e.g., the bank not currently being used to control the system) of the flash memory while the other bank continues to control some of the system operations. Following a successful re-flash of the target bank with the updated/new firmware image, control of the system using the new firmware from the target bank is accomplished as described herein without using a bank swapping command provided by the manufacturer of the microcontroller, which includes a reboot of the microcontroller that includes at least shutting down the CPU and/or the interrupt controller for a period of time. Such shut down causes a loss of control of the external system meant to be controlled by the microcontroller. By using the techniques described herein, microcontroller shutdown is not required, and loss of system control is avoided. In many cases, the transition of operation from one bank to another is seamless.

Figure 1:
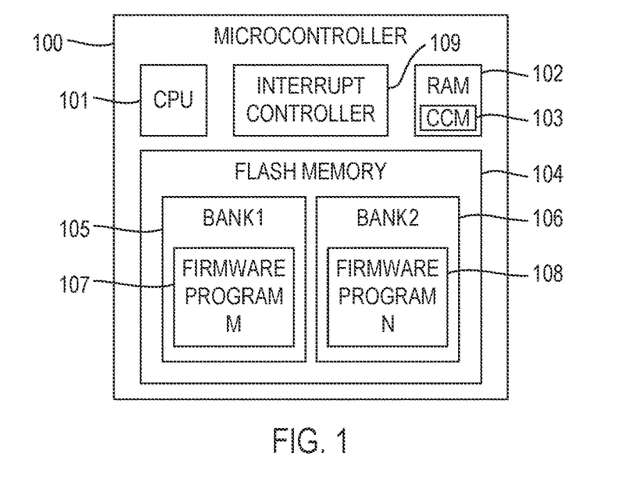
FIG. 1 is a block diagram of a portion of a multi-bank microcontroller according to an example.

FIG. 1 is a block diagram of a portion of a multi-bank microcontroller 100 capable of performing seamless bank-swapping according to an example. The microcontroller 100 includes a central processing unit (CPU) 101 for processing and responding to various instructions that direct the function of the microcontroller 100 and operation of the external system into which it is incorporated (e.g., the power supply unit 1200 illustrated in FIG. 12). Random-access memory (RAM) 102 allows the storage of working data and provides a location for storing machine-executable code. In some examples, the microcontroller 100 may also include core-coupled memory (CCM) 103 that may be implemented in SRAM and that allows significant decrease of code execution time compared with code execution from other areas of the microcontroller memory such as the flash memory 104.

In addition to the RAM 102, the flash memory 104 provides another location for storing machine code that is retrievable by the CPU 101 for external system operation. As illustrated, the flash memory 104 incorporates two separate banks of memory (Bank1 105 and Bank2 106) capable of storing, as described herein, separate versions of firmware. For example, Bank1 105 may store a first firmware program M 107, and Bank2 106 may store a second firmware program N 108. While two banks of memory are described and illustrated herein, the flash memory 104 is not restricted to two banks of memory, and embodiments of the microcontroller 100 may include multiple banks of memory greater than two in accordance with the disclosure herein.

In operation, according to an example, the CPU 101 reads instructions from firmware M 107 to execute one or more operations related to controlling the external system. An interrupt controller 109 provided in the microcontroller 100 may be triggered by an interrupt event that causes code execution of the firmware M 107 to be temporarily halted in favor of interrupt code execution related to the interrupt event. Interrupt service routines (ISRs) in the interrupt controller 109 may include, for example, a control loop routine, a protection routine, and the like. Following a termination of the execution of the interrupt code, the CPU 101 may return to the execution of the firmware M 107 (e.g., such as at the point in the code of the firmware M 107 that was interrupted) for continued control of the external system as directed by the firmware code.

Once stored in the respective bank of flash memory, the firmware M 107 is accessed by the CPU 101 in read mode to perform control operations contained therein. However, the control operations defined in the firmware M 107 may become outdated or otherwise obsolete in favor up new or updated code. In a single-bank microcontroller, updating the firmware code would require the CPU 101 to cease execution of code from the installed firmware for a new firmware image to be written in its place. A dual- or multi-bank microcontroller such as the microcontroller 100 illustrated in FIG. 1 provides a separate bank (e.g., Bank2 106) into which the new/updated code may be written without removing and/or overwriting the code of the firmware M 107 in the Bank1 105. In an exemplary embodiment, the microcontroller 100 allows simultaneous writing of the separate firmware image (e.g., firmware N 108) into the other bank (e.g., Bank2 106) while the CPU 101 maintains its operating access of the first firmware image (e.g., firmware M 107) stored in the first bank (e.g., Bank1 105). In this manner, operations of the external system by the CPU 101 from the first firmware image may continue uninterrupted (except by the continued operation of the interrupt controller 109) by the re-flashing of the other bank with the new firmware image. For example, the microcontroller 100 may include a Read-While-Write (RWW) function that allows the existing firmware to run while the new firmware is written to the spare bank. As further described herein, switching to running the new firmware (e.g., performing a bank-swapping procedure) is possible without shutting down either the CPU 101 or the functions of the interrupt controller 109.

Figure 2:
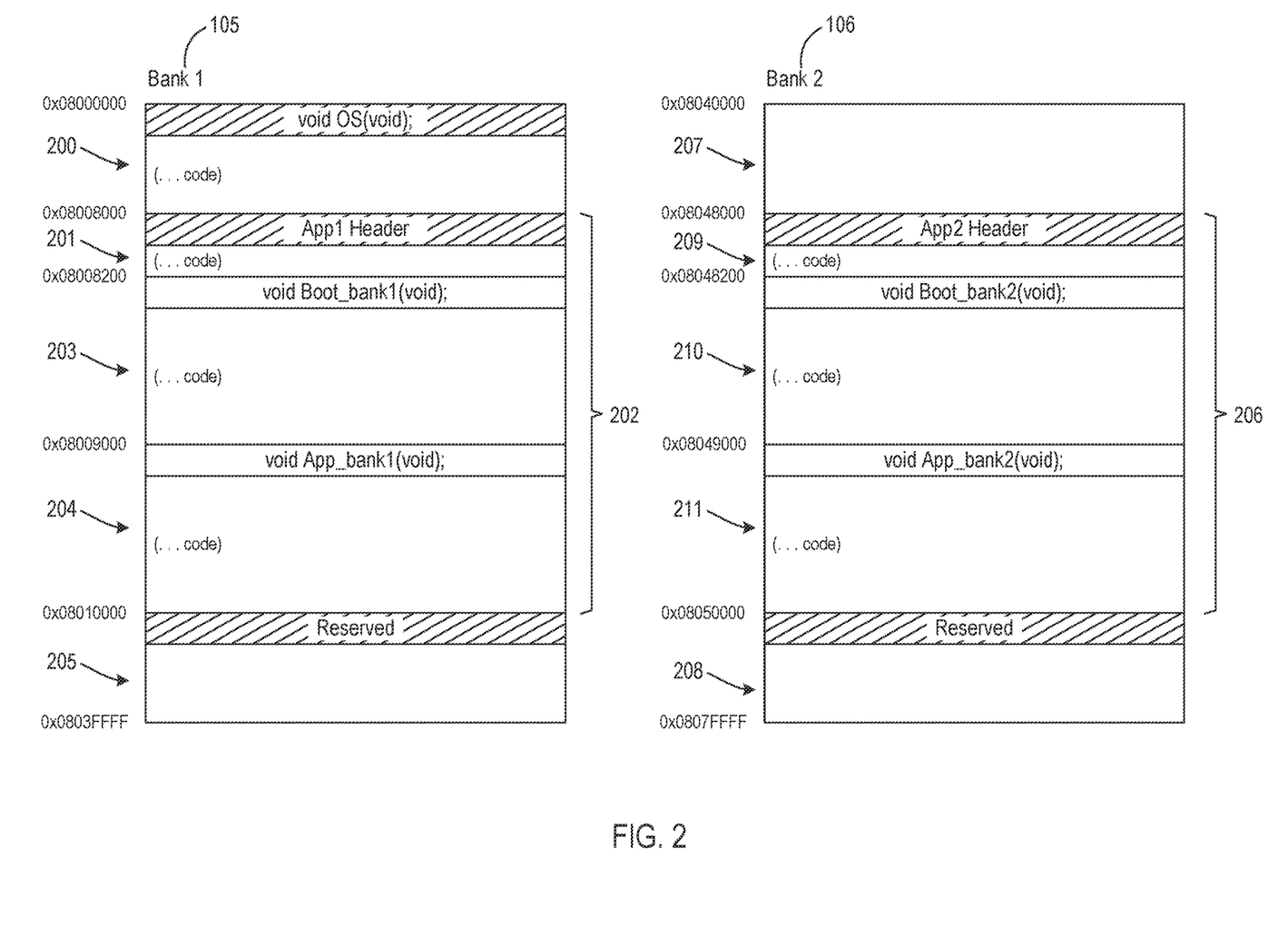
FIG. 2 is a block diagram of a portion of the bank memory of the microcontroller of FIG. 1 according to an example.

FIG. 2 illustrates a block diagram of a portion of the bank memory (e.g., Bank1 105, Bank2 106) of the microcontroller 100 of FIG. 1 according to an example. As illustrated Bank1 105 begins at memory address 0x08000000 of the flash memory 104, and Bank2 106 begins at memory address 0x08040000. Accordingly, 256 KB of memory is allocated to each bank105, 106. Referring to Bank1 105, a first 32 KB portion of the memory (address range 0x08000000-0x08008000) is dedicated to an operating software procedure 200. A 0.5 KB portion is used for the header 201 of a first firmware application ("App1") 202 while a boot procedure 203 and an application procedure 204 of the first firmware application 202 occupy 31.5 KB and 32 KB of the flash memory 104, respectively. The allocated memory sizes specified above (e.g., 256 KB, 0.5 KB, 31.5 KB, and 32 KB) for the first firmware application 202 are merely exemplary, and each section 201, 203, 204 may occupy more or less memory. Furthermore, more than one application procedure such as application procedure 204 may be implemented within the first firmware application 202. For the example illustrated in FIG. 2, an end portion 205 of the memory in Bank1 105 is reserved for other purposes separate from any firmware instruction code specified in the first firmware application 202. For example, the end portion 205 may be used for temporary data storage.

In one embodiment and as illustrated in the examples herein, the operating software procedure 200 is executed from its storage location in Bank1 105. However, embodiments also contemplate moving and/or copying the operating software procedure 200 to CCM memory storage (e.g., CCM 103 of FIG. 1) for a reduction in execution time as described above. When executed from CCM memory, a substitution of the execution of the operating software procedure 200 from Bank1 105 in the examples below for the execution of the operating software procedure 200 from the CCM memory may be understood.

Referring to Bank2 106, an equal amount of memory (e.g., address range 0x08048000 to 0x08050000) is used for a second firmware application 206 as is used for the first firmware application 202. As in Bank1 105, a first portion 207 of memory (e.g., address range 0x08040000 to 0x08048000) is found at memory addresses between the start of Bank2 106 and the second firmware application 206, and an end portion 208 of memory (e.g., address range 0x08050000 to 0x0807FFFF) is found at memory address after the second firmware application 206. Similar to the first firmware application 202, the second firmware application 206 includes a header 209, a boot procedure 210, and an application procedure 211. While a same size of memory addresses is illustrated as being allocated for first and second firmware applications 202, 206, the multi-bank feature of the microcontroller 100 allows different first and second firmware applications 202, 206 to be stored in the banks 105, 106 for the execution of different firmware versions. For example, the second application procedure 211 may occupy more of the allocated memory of Bank2 106 than the memory occupied by the first application procedure 204 of Bank1 105. In another example, however, the firmware versions stored in the first and second firmware applications 202, 206 may be the same. Further, embodiments of this disclosure are not restricted to the allocated memory address locations illustrated in FIG. 2. Different microcontrollers with flash memory sizes different from that described herein or with the same size as provided herein but having a different memory address allocation may benefit from implementing aspects of this disclosure without departing from the scope thereof.

Figure 3:
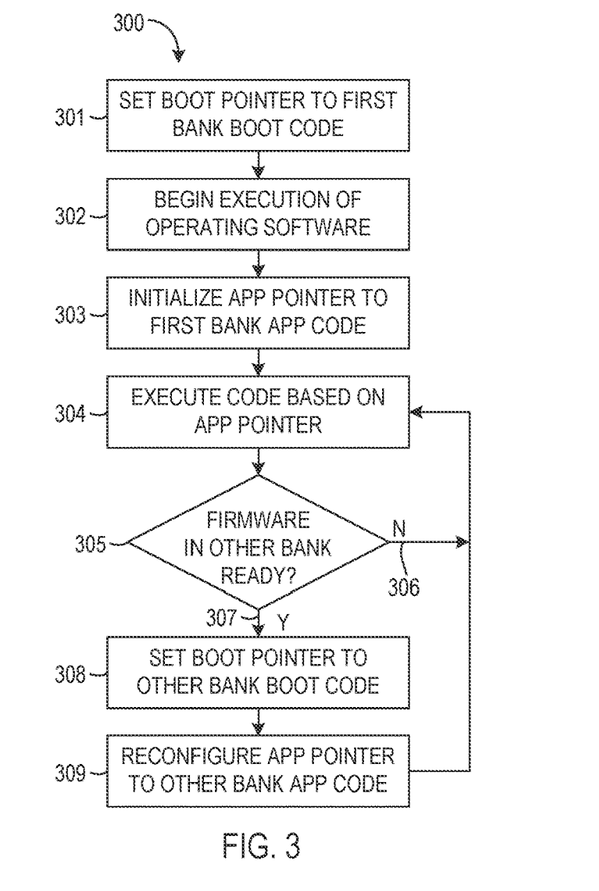
FIG. 3 is a flowchart of a firmware execution method employing bank swapping according to an example.

FIG. 3 illustrates a flowchart of a firmware execution procedure or method 300 employing bank swapping according to an example. FIG. 11 illustrates a flowchart of a re-flash or firmware image update procedure 1100 or method according to an example. As described herein, completion of the execution of the firmware image update procedure 1100 may cause the firmware execution procedure 300 to swap code execution from one bank to another (e.g., from Bank1 105 to Bank2 106 or vice versa). FIGS. 4-10 illustrate block diagrams visually illustrating portions of the methods of FIGS. 3 and 11 according to an example as described below. The block diagrams of FIGS. 4-10 illustrate portions only of the Bank1 105 and Bank2 106 illustrated in FIG. 2. For example, the operating software procedure 200 and the first and second firmware applications 202, 206 are illustrated while omitting other portions illustrated in FIG. 2. Any omitted portions in FIGS. 4-10 are for clarity and simplicity reasons in describing aspects of this disclosure, and such omitted portions may be referred to in other parts of this disclosure. Further, for ease in referring to specific lines of the example pseudo code illustrated in FIGS. 4-10, line identifiers $A_1$-$S_1$ and $D_2$-$S_2$ are provided.

Bank1 105 and Bank2 106 provide computer-readable memory for storing computer-readable instructions related to firmware or other instructions. In the code examples illustrated in FIGS. 4-10, pseudo-code examples are used to facilitate discussion of the aspects of the bank-swapping and other operation functions/instructions herein. It is understood that the corresponding computer-readable instruction code stored in the banks 105, 106 for execution is in a format readable by a processing unit (e.g., CPU 101 of FIG. 1).

As stated previously, embodiments of this disclosure provide that system control may be swapped from a first bank (e.g., Bank1 105) to a second bank (e.g., Bank2 106) without using a bank swapping command provided by the manufacturer of the microcontroller. Such bank swapping is accomplished using software pointers. As is known, a software pointer (or "pointer" as also used herein) is an object (e.g., a variable) whose value is the memory address of another object. When the object is a procedure, the procedure identified by its memory address stored in the pointer may be executed in response to processing the pointer. For example, a code instruction to execute a memory address stored in the pointer as a procedure can execute a first procedure when the memory address of the first procedure is stored in the pointer or can execute a different procedure when the memory address of the different procedure is stored in the pointer. The same code instruction configured to process the memory address of the pointer as a function can process one of a number of different procedures merely by changing the value of the pointer.

Figure 4:
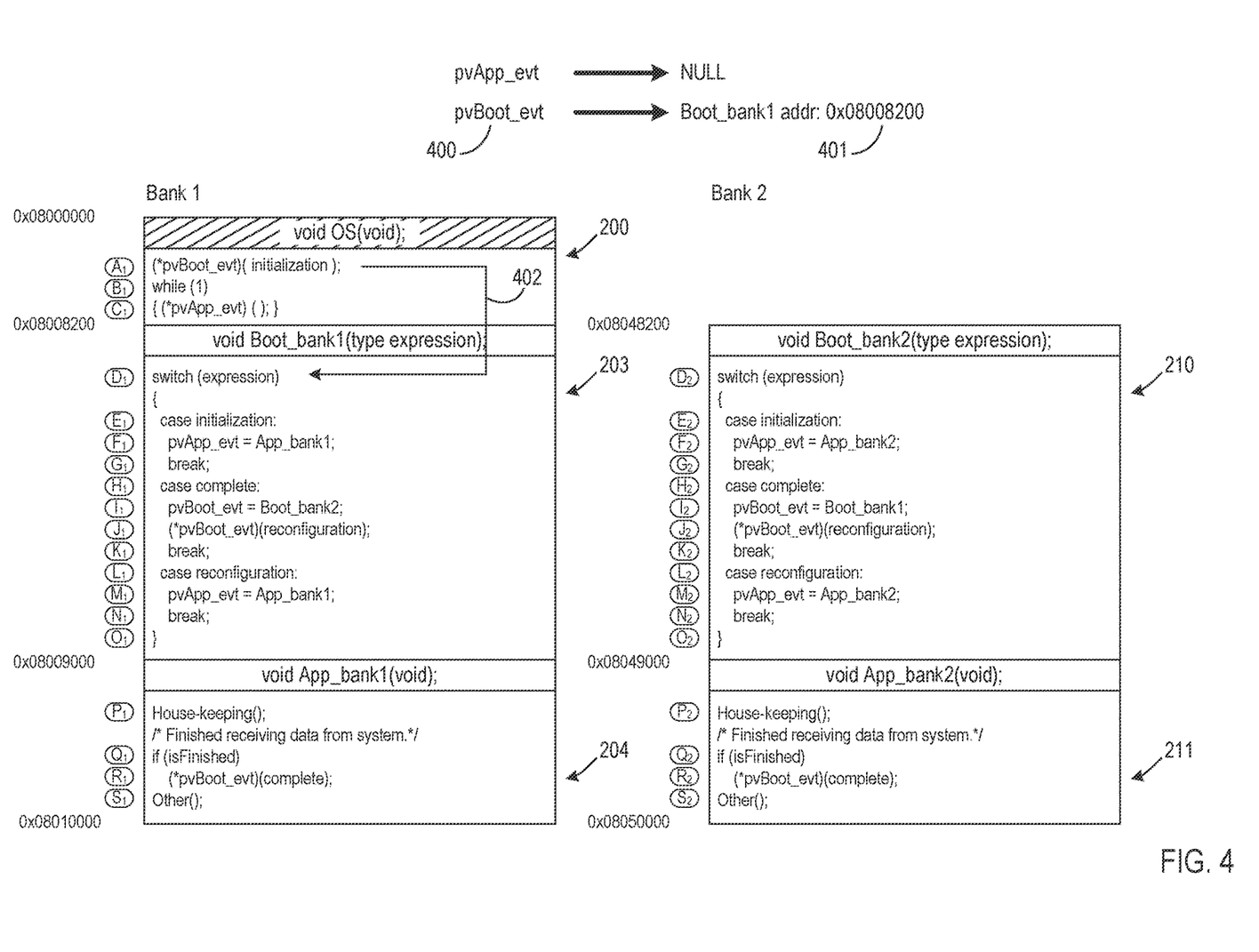
FIGS. 4-10 are block diagrams visually illustrating portions of the methods of FIGS. 3 and 11 according to an example.

Referring to FIGS. 3 and 4, the firmware execution procedure 300 initializes a boot pointer 400 by setting the boot pointer 400 to the memory address of a first bank boot code at step 301. As illustrated in FIG. 4, the value 401 of the boot pointer 400 is set to the address of the Boot_bank1 procedure (e.g., boot procedure 203) located at memory address 0x08008200. With the boot pointer 400 set, execution of the operating software procedure 200 (including lines $A_1$-$C_1$) is begun at step 302. At line $A_1$, the operating software procedure 200 includes an instruction to execute the memory address stored in the boot pointer 400 as a procedure. Since the value 401 stored in the boot pointer 400 contains the memory address of the Boot_bank1 procedure, the Boot_bank1 procedure is called 402 with an expression parameter set to "initialization". As provided in the examples herein, the Boot_bank1 and App_bank1 procedures 203, 204 stored in the first bank (e.g., Bank1 105 of the flash memory 104) are of the default firmware image used during control of the external system at system start-up. Thus, initialization of the pointer values is directed to the procedures of Bank1 105. However, in other embodiments of the disclosure, the procedures of Bank2 106 may be set as the default start-up procedures.

Figure 5:
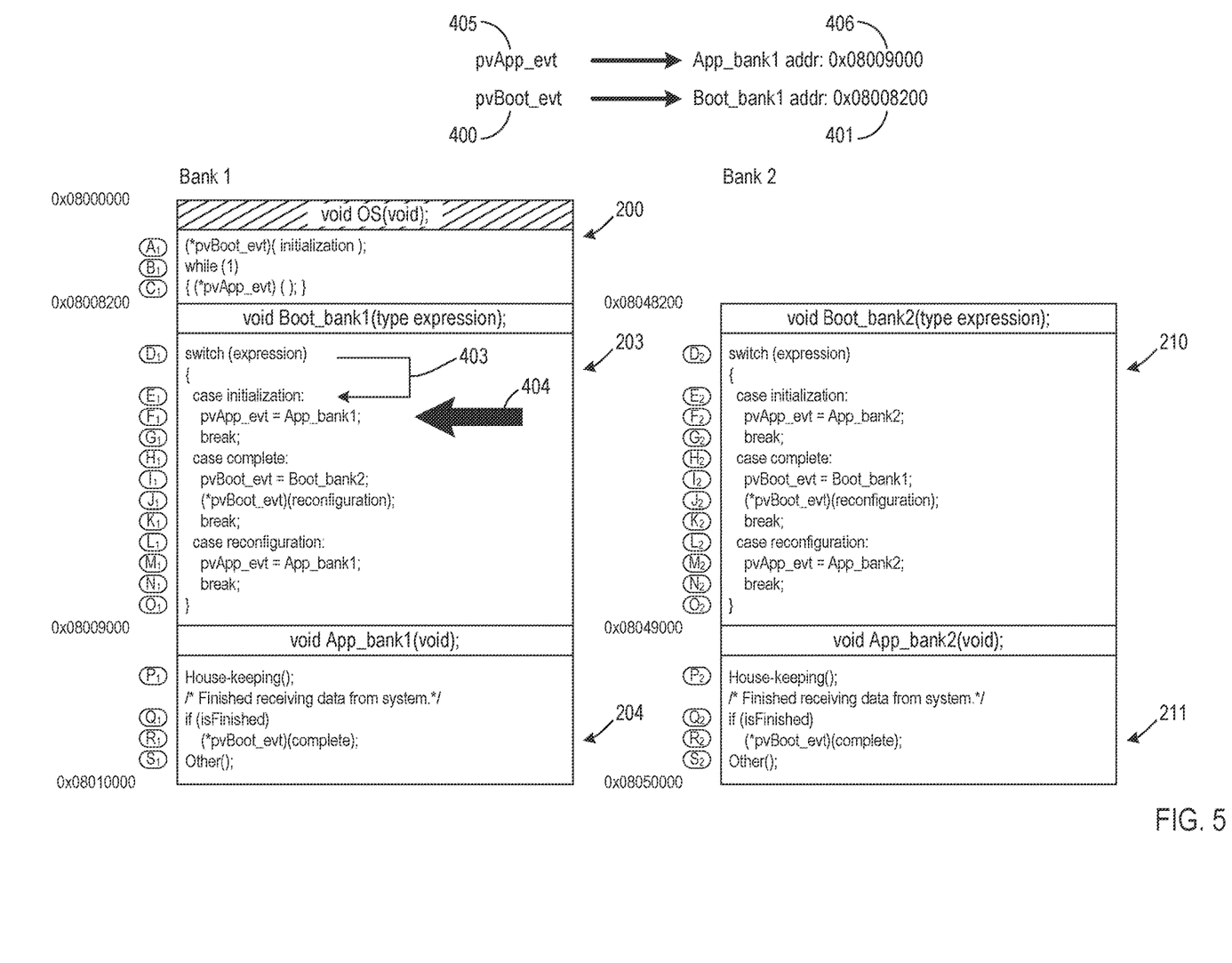

Referring to FIGS. 3 and 5, the Boot_bank1 procedure 203 includes a switch statement (lines $D_1$-$O_1$) that evaluates the expression parameter included in the function call. Optionally, the expression parameter may be a global variable not passed as a procedure call parameter. The switch statement evaluates one or more of its cases for a case matching the received "initialization" parameter. As illustrated, the initialization case is found in lines $E_1$-$G_1$, and the code executes 403 the initialization case. At line $F_1$ (and as indicated by the bold arrow 404), a second pointer variable corresponding to an app pointer 405 has its value 406 initialized (step 303) to the memory address of the firmware application procedure (e.g., application procedure 204 of FIG. 2), which corresponds with the memory address 0x08009000.

Figure 6:
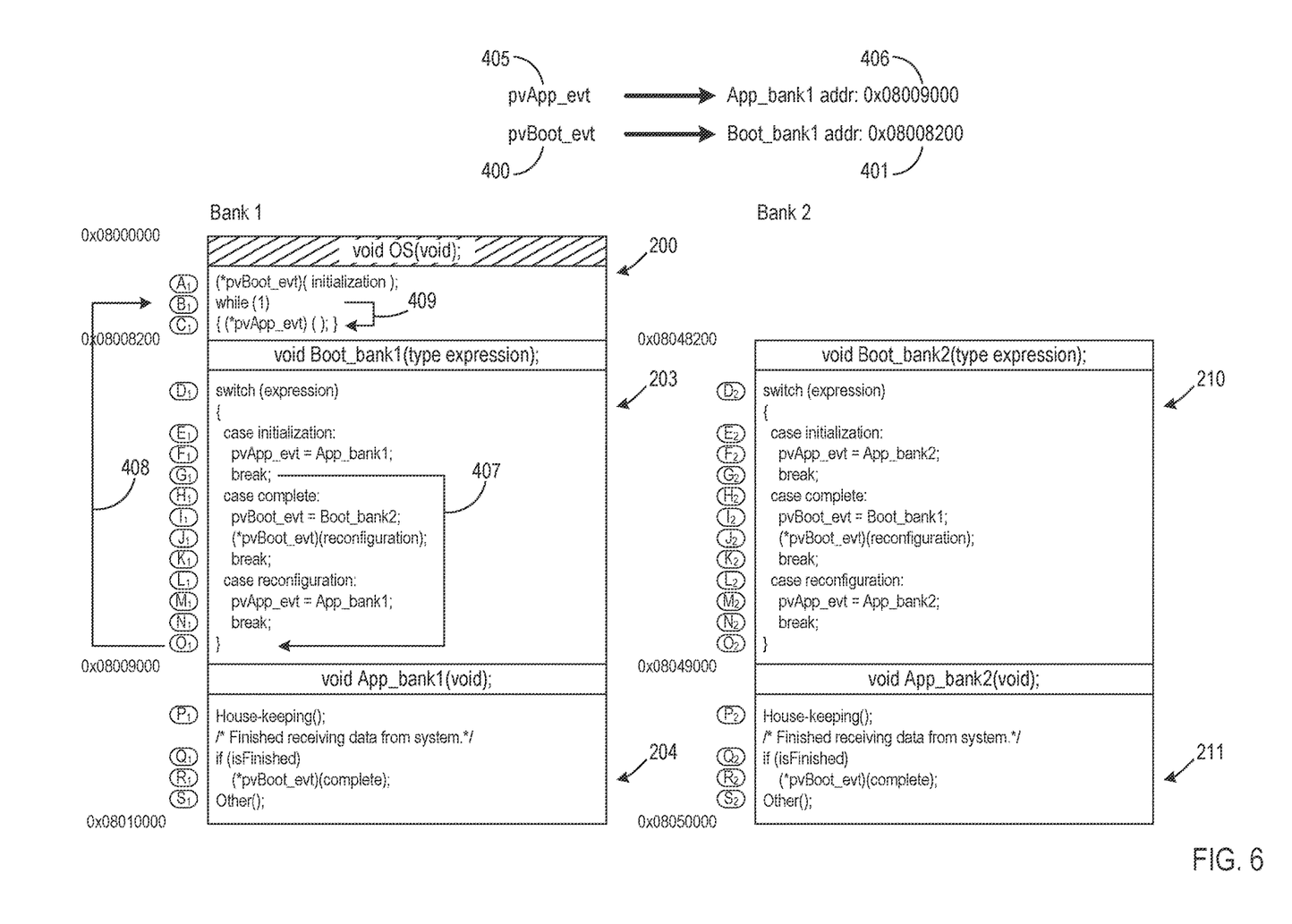

As illustrated in FIG. 6, the break statement on line $G_1$ of the initialization case causes the code execution to proceed 407 to the end of the switch statement on line $O_1$. At the end of the Boot_bank1 procedure 203, code execution returns 408 to the operating software procedure 200. The while loop in lines $B_1$-$C_1$ of the operating software procedure 200 is the target after the return from the Boot_bank1 procedure 203. Accordingly, code execution processes 409 line $C_1$ by executing the memory address stored in the app pointer 405 as a procedure.

Figure 7:
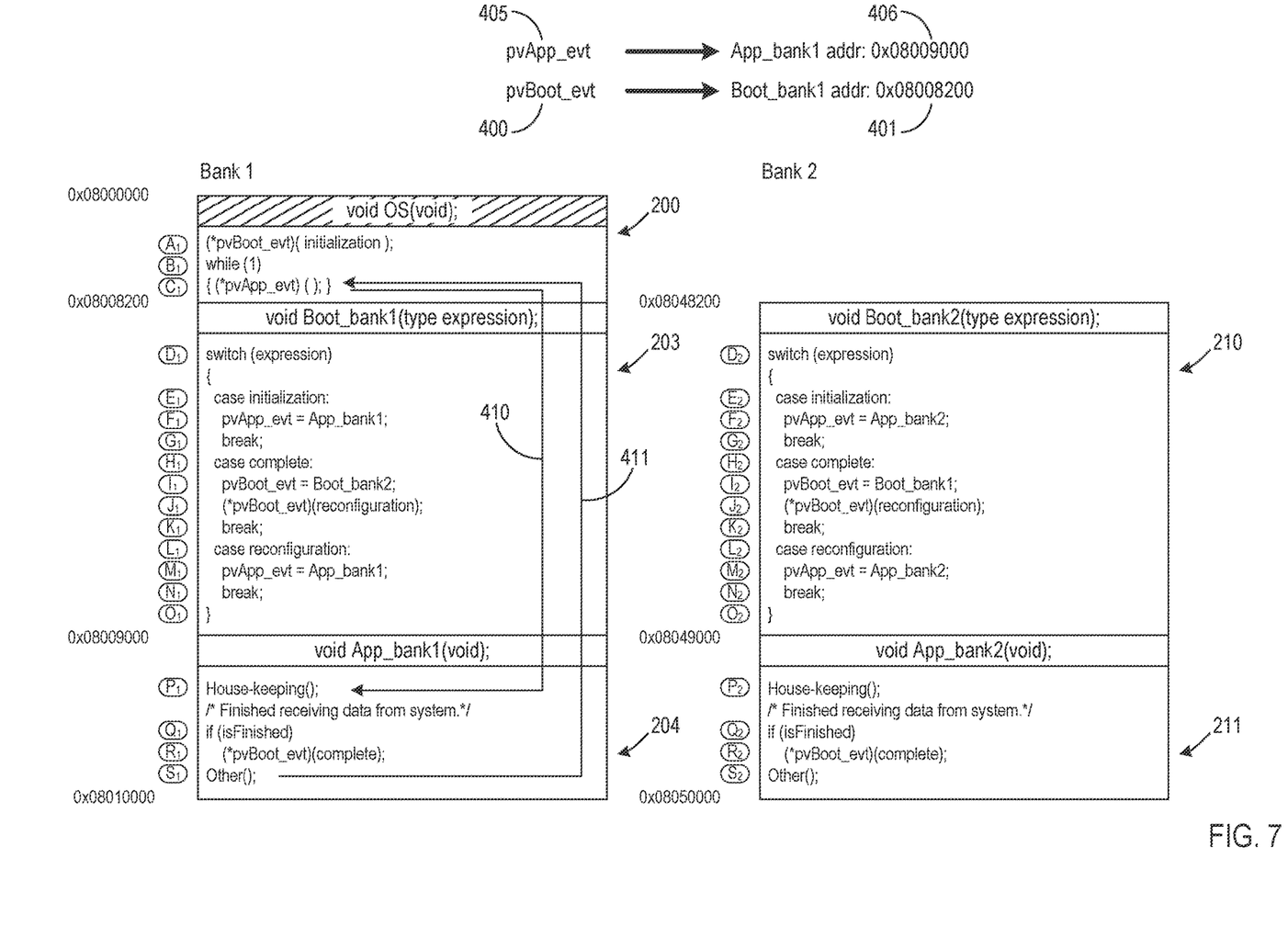

Referring to FIGS. 3 and 7, since the value of the app pointer 405 has the memory address of the App_bank1 procedure 204 stored therein in response to the initialization steps discussed above, code execution proceeds 410 to the App_bank1 procedure 204 for execution (step 304) based on the app pointer 405. During execution of the App_bank1 procedure 204, one or more instructions related to house-keeping as identified by the pseudo code on line $P_1$ may be executed as desired for the firmware control functions of the external system. The house-keeping instructions may be related to, for example, the handling of input power metering and/or the monitoring of one or more factors such as input AC voltage, one or more converted DC voltages within the external system, temperature, etc. Other instructions (e.g., identified by the pseudo code on line $S_1$) may also be executed per the firmware requirements and may include, for example, LED control, output signal sequencing, fan control, temperature monitoring, etc.

At some point (e.g., line $Q_1$) during execution of the App_bank1 procedure 204, a flag parameter (e.g., "isFinished") is monitored or checked to determine (step 305) whether a firmware update to the other firmware bank (e.g., Bank2 106) is complete and ready to assume firmware control of the external system. If there has been no firmware update to the other bank (306) or if a firmware update is not yet completed, execution of the code of App_bank1 procedure 204 is completed after finishing executing the Other instructions, and code execution returns 411 to the calling procedure (e.g., line $C_1$ of the operating software procedure 200). In the operating software code examples shown herein, the execution of the memory address stored in the app pointer 405 as a procedure is the sole instruction in the while loop (lines $B_1$-$C_1$) of the operating software procedure 200. Accordingly, code execution returns 410 to the App_bank1 procedure 204 for execution (step 304) based on the app pointer 405. While no new or updated firmware in the other bank is flagged as being ready for execution by the "isFinished" parameter, for example, the active operating firmware control remains with the App_bank1 procedure 204.

Figure 8:
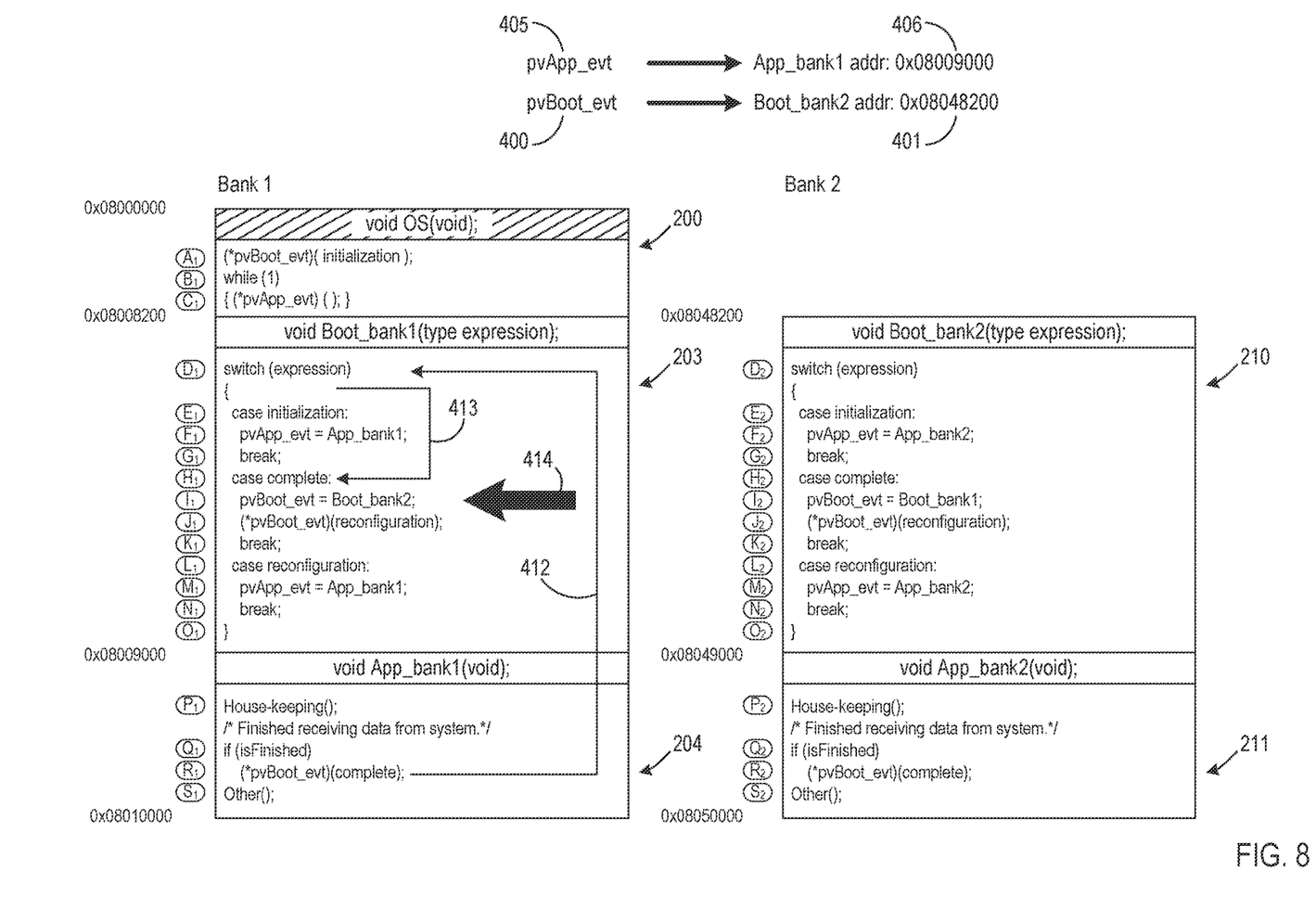

If there has been a firmware update (e.g., in response to the completion of a first re-flash event) and the "isFinished" or other parameter indicates that the firmware image installed in the other bank is ready (307), the "if" condition in line $Q_1$ of the App_bank1 procedure 204 is satisfied, and line $R_1$ is executed to process the memory address stored in the boot pointer 400 as a procedure. As illustrated in FIG. 8, the memory address of the Boot_bank1 procedure 203 is still stored in the boot pointer 400 and is called 412 together with the expression parameter set to "complete". The complete case (lines $H_1$-$K_1$) of the switch statement is executed 413, which includes, as identified by the bold arrow 414 indicating line $I_1$, storing the memory address of the Boot_bank2 procedure 210 (e.g., 0x08048200) in the value 401 the boot pointer 400. Accordingly, the boot pointer 400 is set (step 308) to the boot procedure of the other bank (e.g., Bank2 106) during the complete case.

Figure 9:
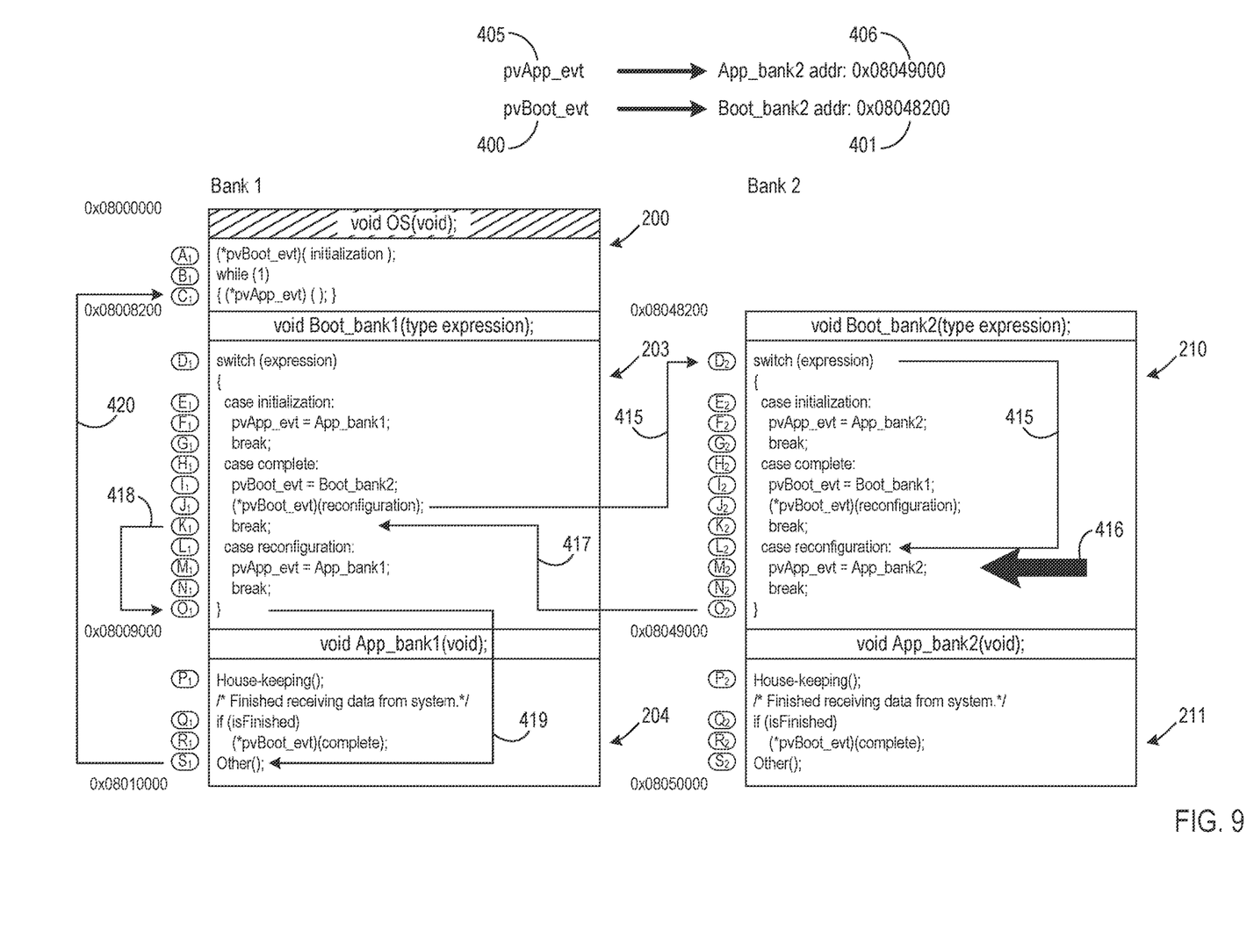

As illustrated at line Ji in FIG. 9, the memory address stored in the boot pointer 400 is executed as a procedure with a "reconfiguration" value provided as the expression parameter. Code execution thus proceeds 415 to the switch statement (lines $D_2$-$O_2$) of the Boot_bank2 procedure 210, which reconfigures (step 309) the app pointer 405 to the memory address of the App_bank2 procedure 211 of the second bank (e.g., Bank2 106). In particular, line $M_2$ of the reconfiguration case (e.g., $L_2$-$N_2$) is executed as identified by the bold arrow 416 to store the memory address of the App_bank2 procedure 211 in the value 406 of the app pointer 405. Following execution of the break statement on line $N_2$, the switch expression and the Boot_bank2 procedure 210 end, and code execution returns 417 to the calling procedure (e.g., the Boot_bank1 procedure 203). Since the break statement on line $K_1$ of the complete case of the Boot_bank1 procedure 203 is executed next, the switch statement of the Boot_bank1 procedure 203 ends 418, and code execution returns 419 to the procedure (e.g., the App_bank1 procedure 204) that called the Boot_bank1 procedure 203. With the return of the code execution back to the App_bank1 procedure 204, the code instructions following the boot procedure call of line $R_1$ may be executed to finish any remaining instructions found in the Other code on line $S_1$ and any other following instructions in the App_bank1 procedure 204 if included. When execution of the App_bank1 procedure 204 is finished, code execution returns 420 to the operating software procedure 200, which called the App_bank1 procedure 204 (see FIG. 7).

Figure 10:
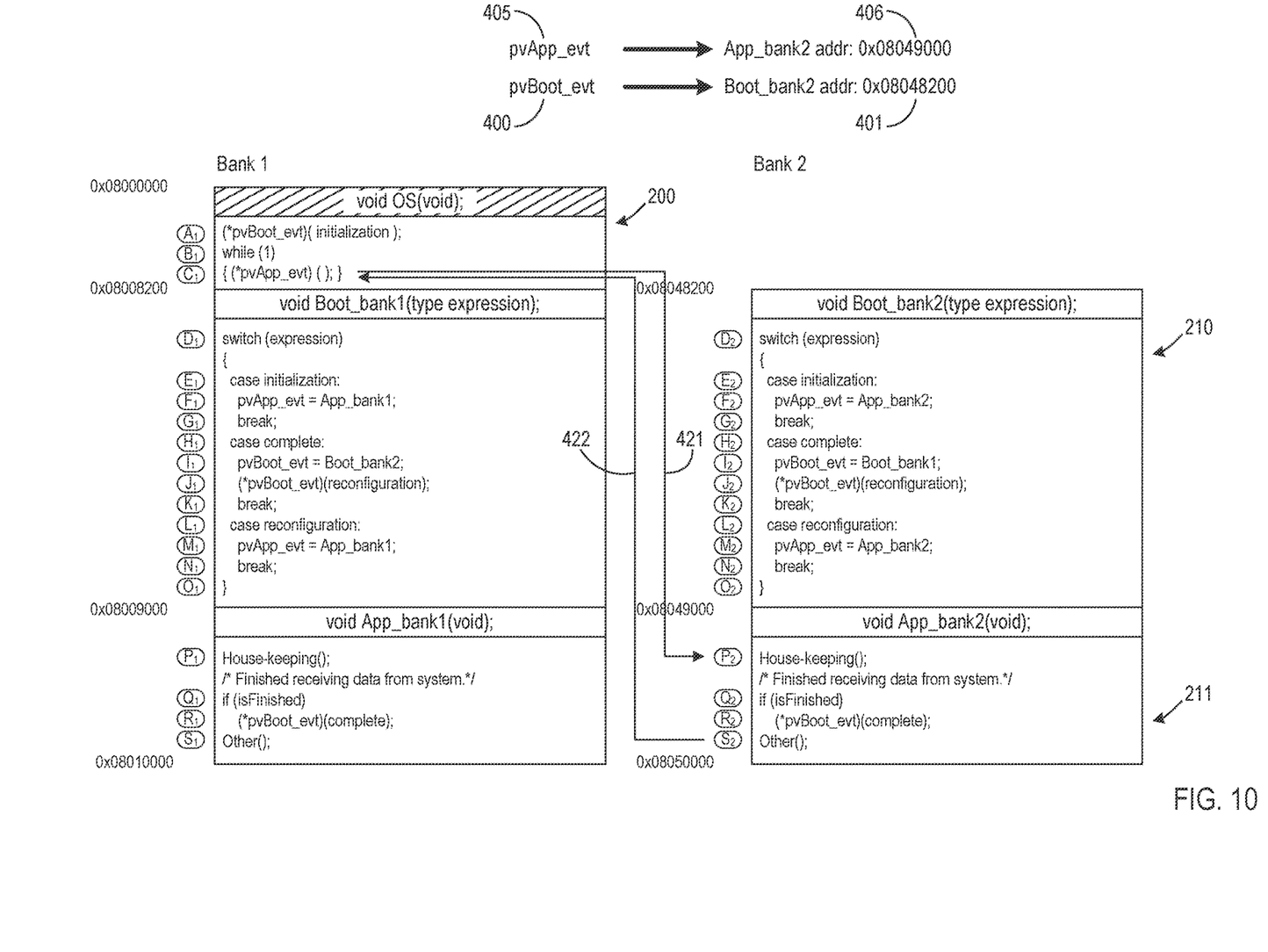
Figure 11:
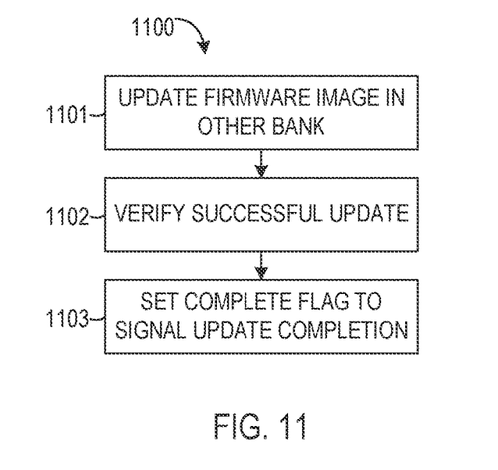
FIG. 11 is a flowchart of a firmware image update method according to an example.

Referring to FIGS. 3 and 10, processing of line $C_1$ of the operating software procedure 200 causes the App_bank2 procedure 211 to be executed in response to the memory address of the App_bank2 procedure 211 being stored in the app pointer 405. While no firmware update is indicated as being complete in line $Q_2$ of the App_bank2 procedure 211, steps 304-306 of the firmware execution procedure 300 are repeated (421, 422) for firmware control of the external system based on the second bank firmware image (e.g., second firmware application 206). However, in response to a subsequent re-flash event, an indication in the flag parameter that the first bank (e.g., Bank1 105) is ready for control using an updated firmware image, a bank-swapping procedure as described herein is implemented to transfer control from Bank2 106 to Bank1 105.

Figure 12:
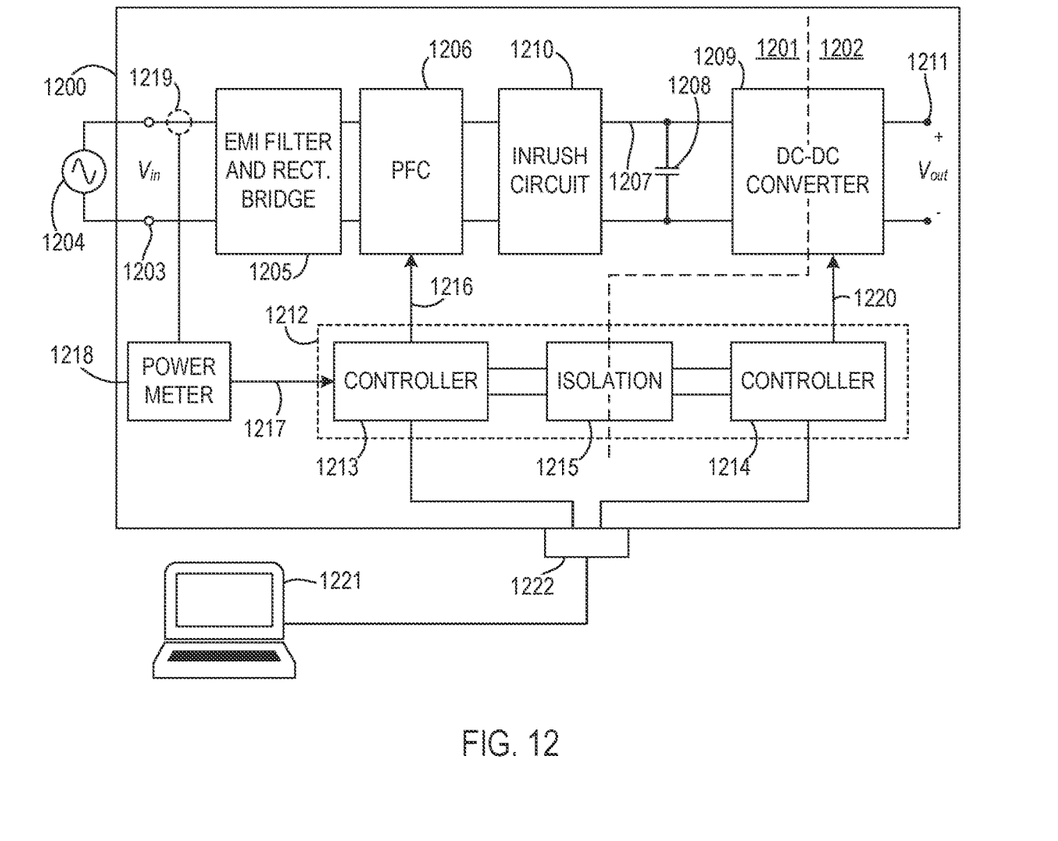
FIG. 12 illustrates a block diagram of a power supply according to an example.

In one embodiment referring FIG. 11, the re-flash or firmware image update procedure 1100 implements a re-flash event using the RWW function of a microcontroller to take advantage of an uninterrupted operation of an external system from a first bank while the second bank is updated. At step 1101, the firmware image in the non-operating bank (e.g., Bank2 106) is updated with an updated firmware image using the RWW function of the microcontroller (e.g., microcontroller 100) while the operating bank (e.g., Bank1 105) is read from for executing firmware operations. In one example, an outside system such as a computer may communicate with the microcontroller (as illustrated in FIG. 12) to store the instructions of the updated firmware image. At step 1102, the updated firmware image stored in the second bank is verified to ensure a successful update of the firmware. In response to verifying that the firmware image stored in the updated bank is correct, a completion flag (e.g., "isFinished") is set at step 1103 that signals to the running firmware application (e.g., App_bank1 procedure 204 or App_bank2 procedure 211) that the other bank has been updated and is ready to take over control. If the updated firmware image stored in the second bank is not verified, the re-flash event may be restarted while the active firmware operations are still maintained from the operating bank.

While lines $Q_1$ and $Q_2$ of the firmware applications illustrated in FIGS. 4-10 provide examples of processing the completion flag to begin bank-swapping, code execution to call the complete case of the active boot procedure whose memory address is stored in the boot pointer 400 may be initiated by one or more code instructions not illustrated in FIGS. 4-10. For example, code within the House-keeping or Other procedures may initiate bank swapping based on criteria other than a successful updating of a firmware image in an inactive bank.

FIG. 12 illustrates a block diagram of a plurality of elements of an external system (e.g., a power supply unit 1200) having bank-swapping microcontrollers based on one or more embodiments of the disclosure provided herein. The power supply unit 1200 has a primary side 1201 and a secondary side 1202. The primary side 1201 includes a voltage input 1203 coupled to receive input voltage from an AC source 1204 such as a power grid. An EMI filter and rectification bridge assembly 1205 coupled to the voltage input 1203 is configured to filter high frequency electromagnetic noise present on the voltage input 1203 and to rectify an AC voltage into a DC voltage. In one embodiment, the EMI filter operates to filter electromagnetic noise on the incoming AC voltage and provide the filtered voltage to the rectification bridge for providing the DC output. A power factor correction circuit 1206 such as contemplated herein is coupled to receive the DC voltage output from the rectification bridge 1205 and to boost the DC voltage to a higher value for supply to a primary side voltage bus 1207 coupled to a bulk capacitor 1208 and to a DC-DC converter 1209. An inrush circuit 1210 may be provided to reduce the effects of current spikes in the energy provided by the PFC circuit 1206. The DC-DC converter 1209 may be a switched mode buck converter to convert the voltage on the primary side voltage bus 1207 into a lower output voltage for supply to a load (not shown) coupled to a voltage output 1211. As illustrated, the DC-DC converter 1209 is coupled to both the primary side 1201 and the secondary side 1202 and includes one or more isolation components (not shown) for isolating the primary and secondary sides 1201, 1202.

The power supply unit 1200 also includes a control circuit 1212 for controlling one or more power switches (not shown) in the power converters 1206, 1209. As shown in FIG. 12, the control circuit 1212 includes a primary side controller 1213, a secondary side controller 1214, and an isolation component 1215 coupled between the primary side controller 1213 and the secondary side controller 1214. The isolation component 1215 may include, for example, an optocoupler, a transformer, etc.

The primary side controller 1213 controls one or more power switches in the AC-DC power converter 1200. For example, the primary side controller 1213 may generate one or more control signals 1216 for controlling the power switches of the AC-DC power converter 1200 for correcting a power factor. The control signals 1216 may be generated based on a sensed parameter 1217 (e.g., an AC input current, an AC input voltage, an AC frequency, and/or a DC bulk voltage) provided by a power meter 1218 coupled to a sensor 1219. As shown in FIG. 12, the secondary side controller 1214 controls switches (not shown) in the DC-DC converter 1209. For example, the secondary side controller 1214 may generate one or more control signals 1220 for controlling one or more power switches (e.g., metal-oxide-semiconductor field-effect transistors (MOSFETs)) and/or one or more synchronous rectifiers (e.g., MOSFETs).

Controllers 1213 and 1214 incorporate one or more of the embodiments described herein according to an example for performing bank-swapping without shutting down their CPUs or their interrupt controllers. A computer 1221 or other similar programming device coupled to a communication port 1222 of the power supply unit 1200 communicates with the controllers 1213, 1214 to perform firmware image updating as described herein (e.g., FIG. 11). By using the RWW function of the controllers, the computer 1221 is able to perform live updating of the firmware in a non-active bank. Using a checksum, a successful update of the firmware image can be verified and the flag parameter accordingly set to signal that bank-swapping is available.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

What is claimed is:

1. A method of swapping code execution among multiple code banks of a microcontroller having computer-readable memory, a central processing unit, and an interrupt controller, the method comprising:
   executing one or more operating software instructions from a first memory storage location of the computer-readable memory, the one or more operating software instructions comprising an instruction to process a first pointer having stored therein an address location of a first application stored within a first code bank of the computer-readable memory;
   executing the first application based on processing the address location of the first application stored within the first pointer;
   executing interrupt instructions based on an interrupt event identified by the interrupt controller, wherein executing the interrupt instructions comprises:
      interrupting the execution of the first application during execution of the interrupt instructions; and
      returning to the execution of the first application in response to terminating the execution of the interrupt instructions;
   replacing the address location of the first application stored within the first pointer with an address location of a second application stored with a second code bank of the computer-readable memory; and
   executing the second application based on executing the one or more operating software instructions to process the address location of the second application stored within the first pointer without stopping operation of the interrupt controller;
   wherein the first memory storage location is located in the first code bank; and
   wherein the second code bank is absent operating software instructions.

2. The method of claim 1, wherein the second code bank comprises computer-readable instructions comprising the second application and comprising a second bank boot procedure.

3. The method of claim 2 further comprising replacing the computer-readable instructions of the second application with a replacement set of instructions while the first pointer has stored therein the address location of the first application.

4. The method of claim 3 further comprising performing a firmware re-flash procedure to replace the computer-readable instructions of the second application with the replacement set of instructions.

5. The method of claim 4 further comprising replacing the computer-readable instructions of the second bank boot procedure during the firmware re-flash procedure.

6. The method of claim 3 further comprising reading and executing the computer-readable memory related to the first application while simultaneously writing the replacement set of instructions to the second code bank.

7. The method of claim 3, wherein the computer-readable memory comprises a second pointer having stored therein an address location of a first bank boot procedure; and
wherein the method further comprises executing a completion process of the first bank boot procedure via processing the second pointer from the first application.

8. The method of claim 7, wherein executing the completion process comprises:
replacing the address location of the first bank boot procedure stored in the second pointer with an address location of the second bank boot procedure; and
executing a reconfiguration process of the second bank boot procedure via processing the second pointer from the first bank boot procedure.

9. The method of claim 8, wherein the reconfiguration process comprises performing the replacing of the address location of the first application with the address location of the second application.

10. The method of claim 1, wherein executing the second application further comprises swapping code execution from the first code bank to the second code bank without stopping operation of the central processing unit.

11. The method of claim 1, wherein executing the second application further comprises swapping code execution from the first code bank to the second code bank without rebooting the microcontroller.

12. The method of claim 1 further comprising moving the one or more operating software instructions from a second memory storage location to the first memory storage location, wherein execution of the one or more operating software instructions from the first memory storage location is faster than execution of the one or more operating software instructions from the second memory storage location.

13. A system comprising:
a microcontroller comprising:
a central processing unit (CPU);
an interrupt controller;
a flash memory having a first bank of memory and a second bank of memory;
wherein the microcontroller is configured to:
execute operating software instructions stored in the first bank of memory of the flash memory to execute instructions of a first application stored in the first bank of memory and identified by a first pointer;
interrupt execution of the instructions of the first application to execute interrupt instructions via the interrupt controller based on an interrupt event;
continue execution of the instructions of the first application after the execution of the interrupt instructions; and
execute the operating software instructions to execute instructions of a second application stored in the second bank of memory and identified by the first pointer;
wherein a memory location of the first application stored in the first pointer is replaced with a memory location of the second application prior to the execution of the operating software instructions to execute the instructions of the second application; and
wherein the second bank of memory is absent operating software instructions.

14. The system of claim 13, wherein the first bank of memory has further stored therein a first bank boot procedure comprising initialization instructions, completion instructions and reconfiguration instructions; and
wherein the second bank of memory has further stored therein a second bank boot procedure comprising initialization instructions, completion instructions and reconfiguration instructions.

15. The system of claim 14, wherein the first bank boot procedure and the first application comprise a first firmware image stored in the first bank of memory; and
wherein the second bank boot procedure and the second application comprise a second firmware image stored in the second bank of memory.

16. The system of claim 15, wherein the microcontroller is further configured to replace the second firmware image with a third firmware image during a first re-flash event; and
wherein the third firmware image comprises an updated second application.

17. The system of claim 16, wherein the microcontroller is further configured to perform the first re-flash event while simultaneously executing the instructions of the first application.

18. The system of claim 16, wherein, in response to completion of the first re-flash event, the microcontroller is further configured to:
execute the completion instructions of the first bank boot procedure to execute the reconfiguration instructions of the second bank boot procedure;
replace the memory location of the first application stored in the first pointer with the memory location of the second application during the execution of the reconfiguration instructions; and
execute the operating software instructions to execute instructions of the updated second application identified by the first pointer.

19. The system of claim 18, wherein the microcontroller is further configured to replace the first firmware image with a fourth firmware image during a second re-flash event, re-flash event comprising an updated first application; and
in response to completion of the second re-flash event:
execute the completion instructions of the second bank boot procedure to execute the reconfiguration instructions of the first bank boot procedure;
replace the memory location of the updated second application stored in the first pointer with the memory location of the updated first application during the execution of the reconfiguration instructions; and execute the operating software instructions to execute instructions of the updated first application identified by the first pointer.

20. The system of claim 13, wherein the system further comprises a power supply unit comprising a voltage converter; and wherein the microcontroller is coupled to the voltage converter and configured to control the voltage converter during the execution of the interrupt instructions to convert an input voltage into an output voltage.

* * * * *